(12) United States Patent
Bonk et al.

(10) Patent No.: US 7,871,128 B2
(45) Date of Patent: Jan. 18, 2011

(54) SEAT RECLINER WTIH SINGLE-POSITION-MEMORY DUMP MECHANISM

(75) Inventors: Jeffery Bonk, Chesterfield, MI (US); Miroslav Tasevski, Rochester Hills, MI (US)

(73) Assignee: Faurecia Automotive Seating, Inc., Troy, MI (US)

( * ) Notice: Subject to any disclaimer, the term of this patent is extended or adjusted under 35 U.S.C. 154(b) by 291 days.

(21) Appl. No.: 12/273,455

(22) Filed: Nov. 18, 2008

(65) Prior Publication Data

US 2010/0123343 A1    May 20, 2010

(51) Int. Cl.
*B60N 2/02* (2006.01)
*B60N 2/48* (2006.01)
(52) U.S. Cl. .............................. 297/378.12; 297/378.1; 297/378.14
(58) Field of Classification Search .............. 297/354.1, 297/354.11, 354.12, 378.1, 378.12, 378.14
See application file for complete search history.

(56) References Cited

U.S. PATENT DOCUMENTS

| | | | |
|---|---|---|---|
| 4,147,386 A * | 4/1979 | Stolper | 297/362 |
| 6,139,104 A | 10/2000 | Brewer | |
| 6,726,282 B2 | 4/2004 | Gray | |
| 6,739,668 B2 | 5/2004 | Coman et al. | |
| 6,863,347 B2 | 3/2005 | De Nichilo | |
| 7,014,265 B2 * | 3/2006 | Yamada et al. | 297/367 R |
| 7,021,716 B2 * | 4/2006 | Persad et al. | 297/378.12 |
| 7,097,253 B2 | 8/2006 | Coughlin et al. | |
| 7,306,286 B2 * | 12/2007 | Syrowik et al. | 297/378.12 |
| 7,364,237 B2 * | 4/2008 | Grable et al. | 297/378.1 |
| 2003/0056329 A1 | 3/2003 | Coman et al. | |
| 2007/0102981 A1 * | 5/2007 | Pejathaya | 297/367 |

* cited by examiner

*Primary Examiner*—David Dunn
*Assistant Examiner*—Philip Gabler
(74) *Attorney, Agent, or Firm*—Barnes & Thornburg LLP

(57) ABSTRACT

A seat-back motion controller is used in a foldable vehicle seat to control motion of a seat back relative to a seat base. The motion controller includes a seat recliner configured to be locked to retain the seat back in a selected reclined position and unlocked to free the seat back to be pivoted forwardly to assume a forward-leaning seat-back dumping position to facilitate passenger access to a back seat area in a vehicle.

19 Claims, 7 Drawing Sheets

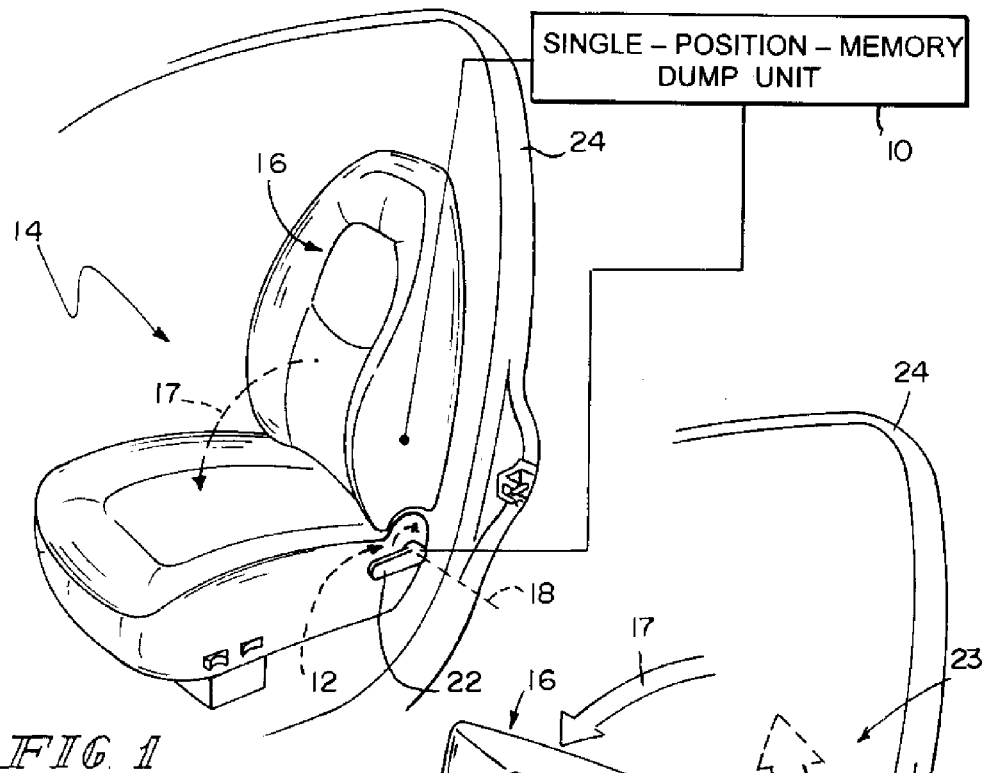
FIG. 1
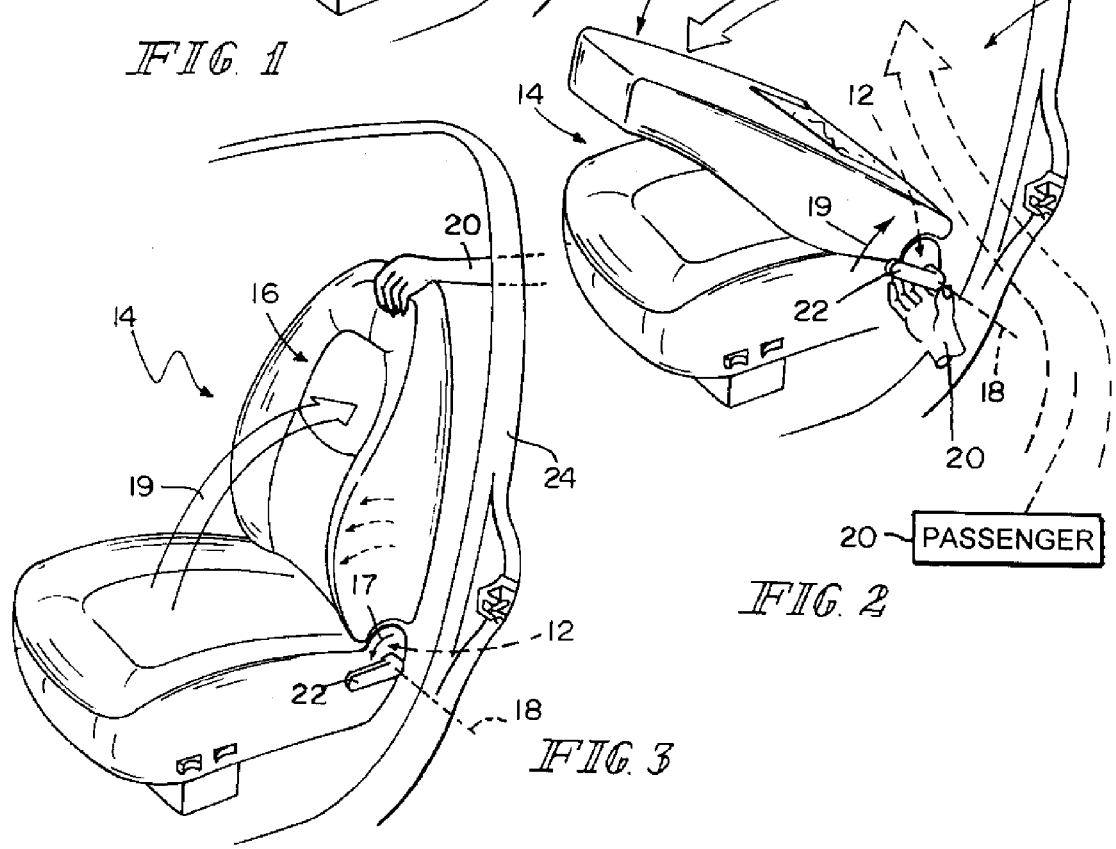
FIG. 2
FIG. 3

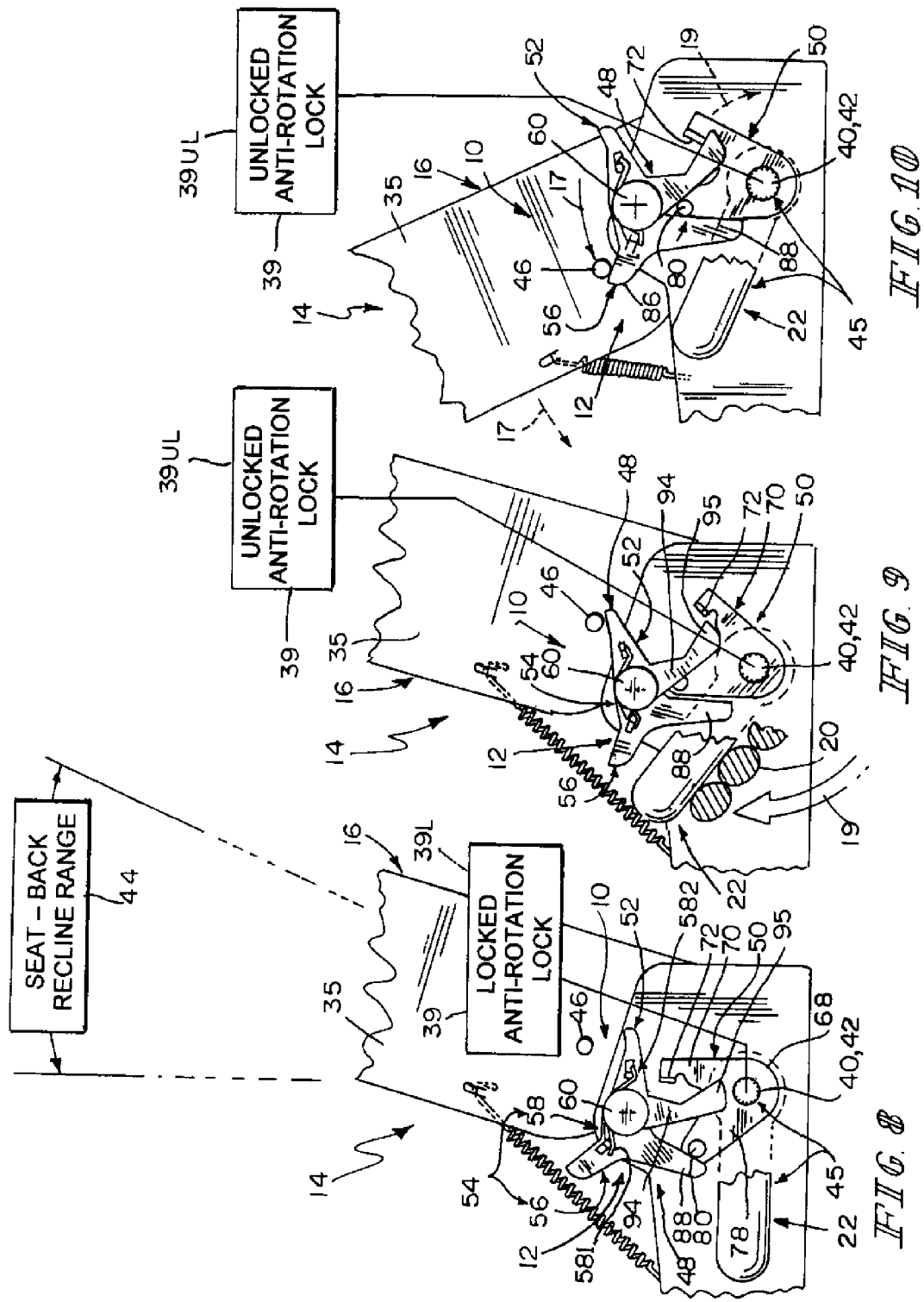

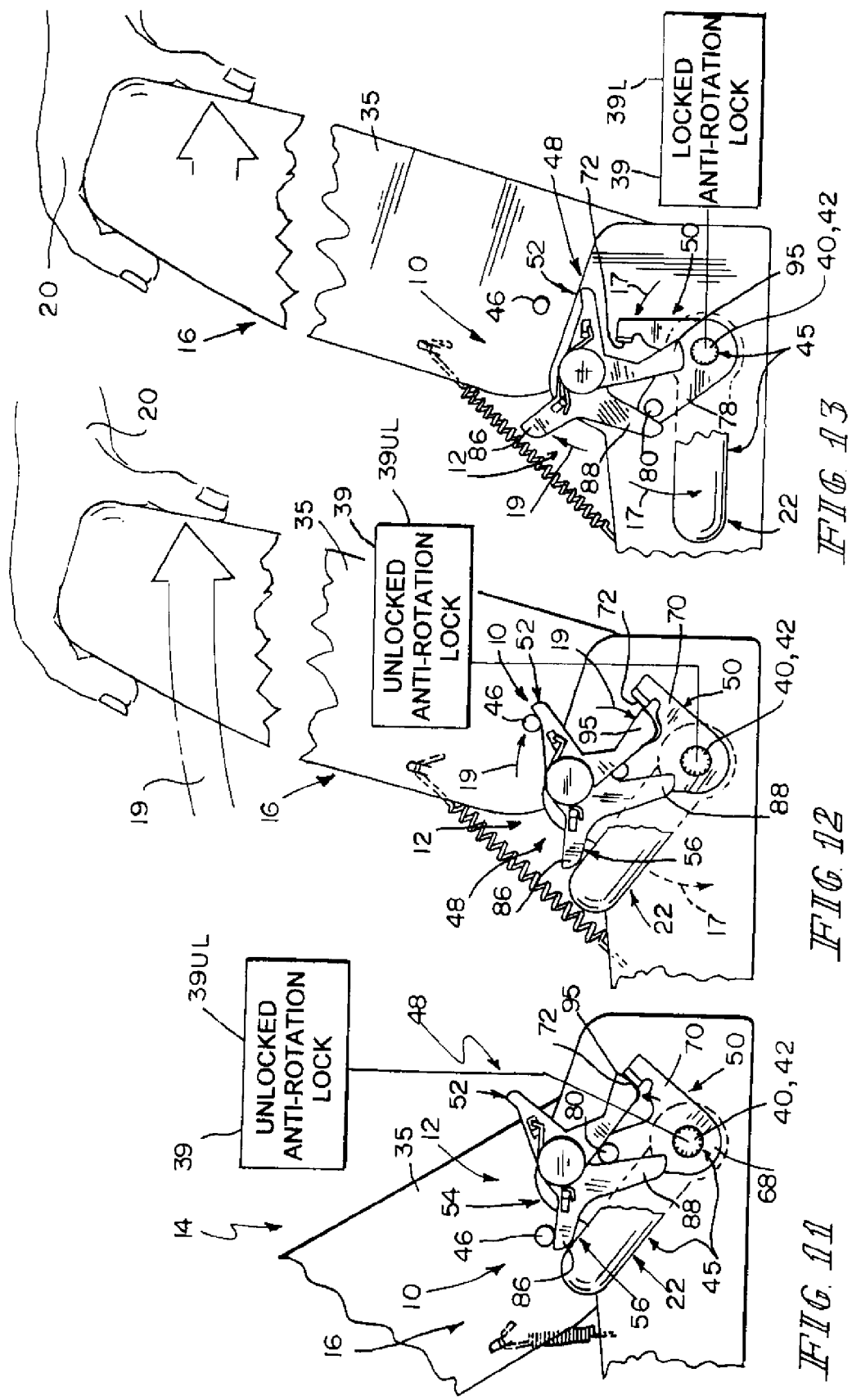

SEAT RECLINER WTIH SINGLE-POSITION-MEMORY DUMP MECHANISM

BACKGROUND

The present disclosure relates to vehicle seats, and particularly to hinge mechanisms for foldable vehicle seats. More particularly, the present disclosure relates to a vehicle seat hinge mechanism having reclining and forward dumping with memory return functionality.

SUMMARY

A seat-back motion controller in accordance with the present disclosure is configured for use in a foldable vehicle seat. The seat-back motion controller is operable to lock a pivotable seat back in a selected position and to unlock the pivotable seat back so that it can be pivoted to a forward-leaning dumped position or a rearward-leaning reclined position. In the forward-leaning dumped position, the seat back is tilted forwardly to allow a passenger to climb past the seat back to enter a back seat of a vehicle more easily.

In illustrative embodiments, the seat-back motion controller includes a seat hinge comprising a seat recliner, an anti-rotation lock mover for moving an anti-rotation lock included in the seat recliner between locked and unlocked positions, and a single-position-memory dump unit. The single-position-memory dump unit is located outside of the load path of the vehicle seat and is configured to return the seat back from the forward-leaning dumped position to a rearward-leaning single predetermined seat-back reset memory position (selected by the manufacturer to provide a design nominal reset memory position).

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 2 is a view similar to FIG. 1 showing that the user has rotated the recliner actuation lever in a clockwise direction to actuate a seat recliner also included in the seat-back motion controller mounted in the vehicle seat using the single-position-memory dump unit in a manner suggested, for example, in FIGS. 4 and 5 to cause a spring provided in the vehicle seat to pivot the seat back forwardly to assume a forward-leaning seat-back dumping position to allow a vehicle passenger to gain access to the back seat area of the vehicle;

FIG. 3 is a view similar to FIGS. 1 and 2 showing rearward pivoting movement of the seat back from the forward-leaning seat-back dumping position shown, for example, in FIG. 10 toward a single predetermined seat-back reset memory position shown, for example, in FIG. 13 after the user has rotated the recliner actuation lever some more in a manner shown, for example, in FIGS. 10-12 to disable temporarily an anti-rotation lock included in the seat recliner provided in the vehicle seat;

FIG. 7 is an exploded perspective assembly view of two illustrative and spaced-apart seat hinges, a first seat recliner (shown in phantom) included in a first of the seat hinges, a second seat recliner (shown in solid) included in a second of the seat hinges and showing that an illustrative anti-rotation-lock mover of the seat-back motion controller includes a recliner control spindle coupled to the anti-rotation locks included in the first and second seat recliners, a recliner actuation lever, and a V-shaped spindle-position controller adapted to mate with the recliner actuation lever to pivot therewith and showing that an illustrative anti-rotation-lock mover anchor of the seat-back motion controller includes a controller rotation blocker located between a dump actuator plate and an actuator spring included in a blocker actuator;

FIGS. 8-13 show a sequence in which a user operates an illustrative seat-back motion controller including a single-position-memory dump unit of the type shown in FIG. 7 to pivot the seat back from a user-selected reclined position shown in FIG. 8 to a forward-leaning seat-back dumping position shown in FIG. 10 and then to a single predetermined seat-back reset memory position shown in FIG. 13;

FIG. 8 shows the seat back of FIGS. 1 and 7 in a user-selected reclined position and showing the recliner actuation lever in a horizontal at-rest position;

FIG. 9 shows clockwise rotation of the recliner actuation lever to rotate the recliner control spindle to move the anti-rotation lock included in each of the first and second seat recliners from the locked position to the unlocked position;

FIG. 10 shows forward pivoting movement of the spring-loaded seat back to assume the forward-leaning seat-back dumping position as soon as the anti-rotation lock is unlocked;

FIG. 11 shows further clockwise movement of the recliner actuation lever to change the position of the controller rotation blocker included in the anti-rotation lock mover to press against a stop pad included in the spindle-position controller of the anti-rotation lock mover to hold the anti-rotation locks in the first and second seat recliners in the unlocked position;

FIG. 12 shows that the seat back is free to be pivoted rearwardly by a user away from the seat-back dumping position while the anti-rotation locks are being held in the unlocked positions by operation of the anti-rotation-lock mover anchor; and FIG. 13 shows that the seat back has been moved by the user to assume a single predetermined seat-back reset memory position that is different from the user-selected reclined position shown in FIG. 8.

DETAILED DESCRIPTION

Figure 6:
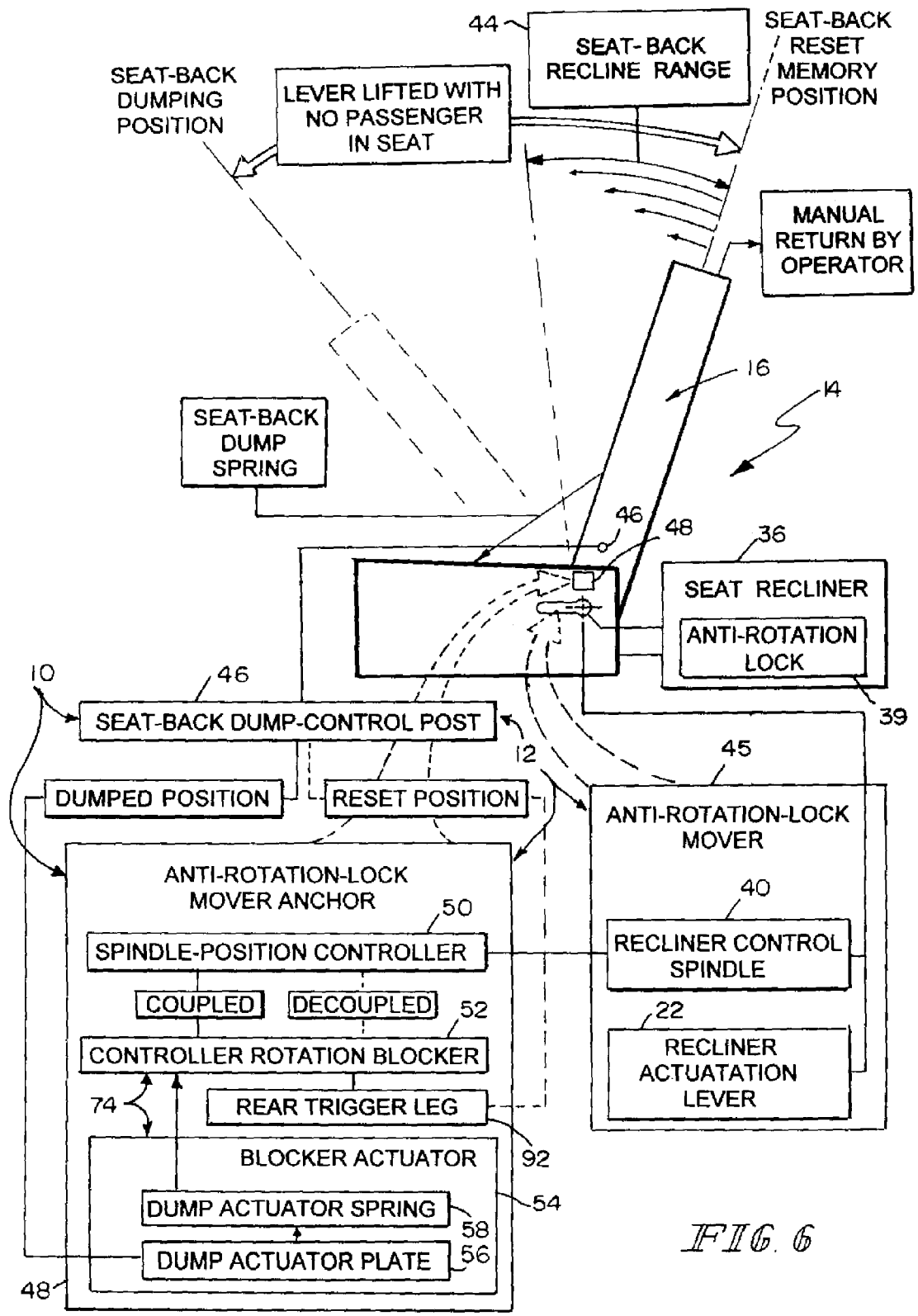
FIG. 6 is a diagrammatic view of the vehicle seat of FIGS. 1-5 showing pivoting motion of the seat back from the user-selected reclined position in a seat-back recline range in a forward direction to the forward-leaning seat-back dumping position and in a rearward direction to the single predetermined seat-back reset memory position and showing various components included in the seat-back motion controller that can be operated by a user to unlock the anti-rotation lock in the seat recliner associated with the seat back (as suggested in FIGS. 9 and 10) so that the seat back can be pivoted by a seat-back dump spring to the forward-leaning seat-back dumping position and also to retain the anti-rotation lock in an unlocked position so that the seat back is free to pivot unimpeded in a clockwise direction from the forward-leaning seat-back dumping position to a single predetermined seat-back reset memory position (as suggested in FIG. 13)
Figure 1:
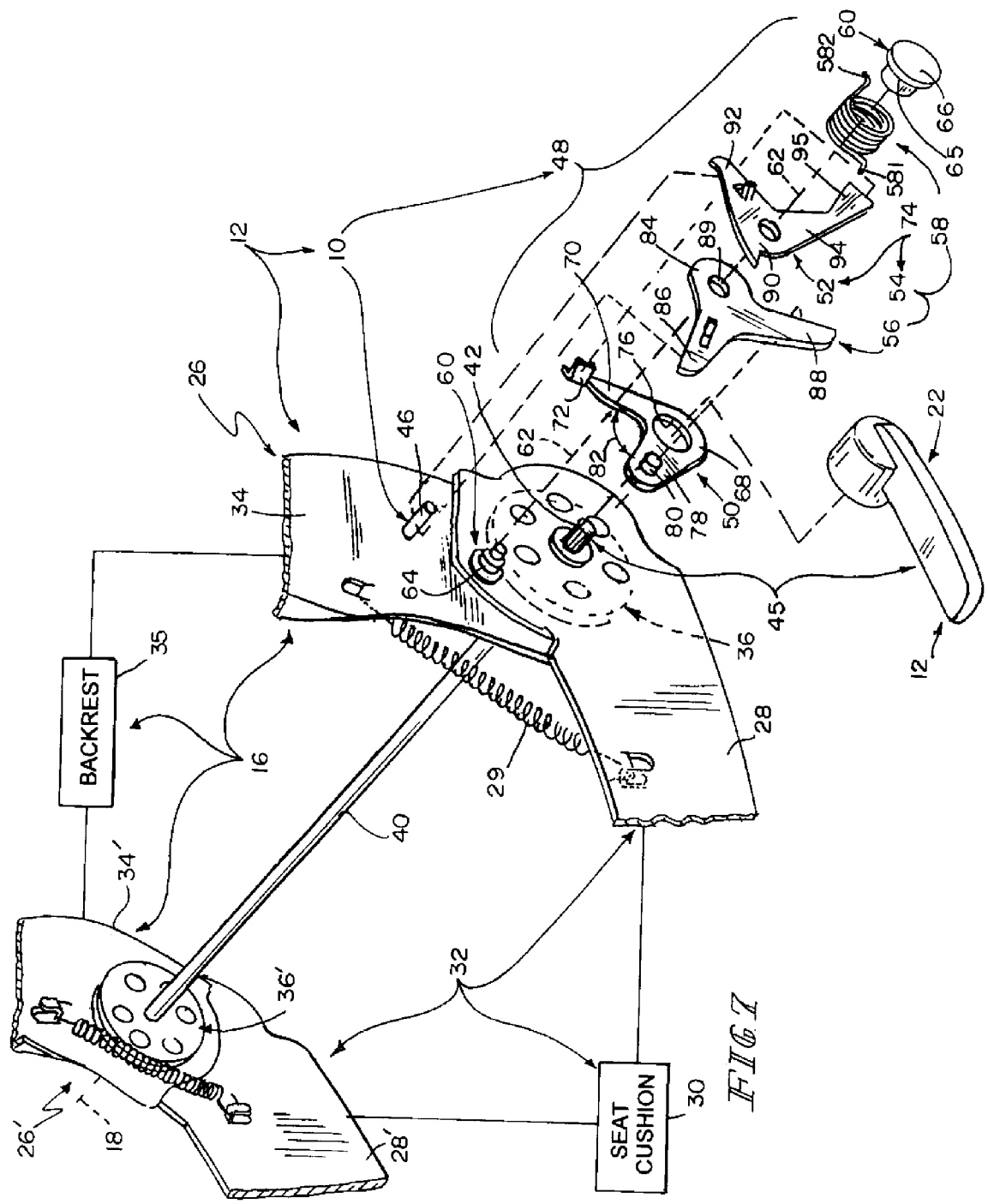
FIG. 1 is a perspective view of a foldable vehicle seat located in an interior compartment of a vehicle and visible through an opened doorway showing a seat-back motion controller including a pivotable recliner actuation lever and a single-position-memory dump unit in accordance with the present disclosure and showing the seat back in a reclined position selected by a user of the vehicle seat.

A single-position-memory dump unit 10 in accordance with the present disclosure is included in a seat-back motion controller 12 used in a vehicle seat 14 as suggested diagrammatically in FIGS. 1 and 6 and illustratively in FIG. 7. A seat back 16 included in vehicle seat 14 can be moved from a user-selected reclined position shown in FIG. 1 about a recliner pivot axis 18 in counterclockwise direction 17 to a forward-leaning seat-back dumping position as shown in FIG. 2 once a passenger 20 has moved a recliner actuation lever 22 to operate single-position-memory dump unit 10 so that passenger 20 can climb easily into a back seat 23 of a vehicle 24 containing vehicle seat 14. Later, as suggested in FIG. 3, passenger 20 can move seat back 16 about recliner pivot axis 18 in a clockwise direction 19 to assume a single predetermined seat-back reset memory position. An illustrative single-position-memory dump unit 10 comprising components shown in FIG. 7 is used as suggested in the forward-dump-and-single-seat-back-reset-memory-position operational sequence illustrated in FIGS. 8-13.

Figure 4:
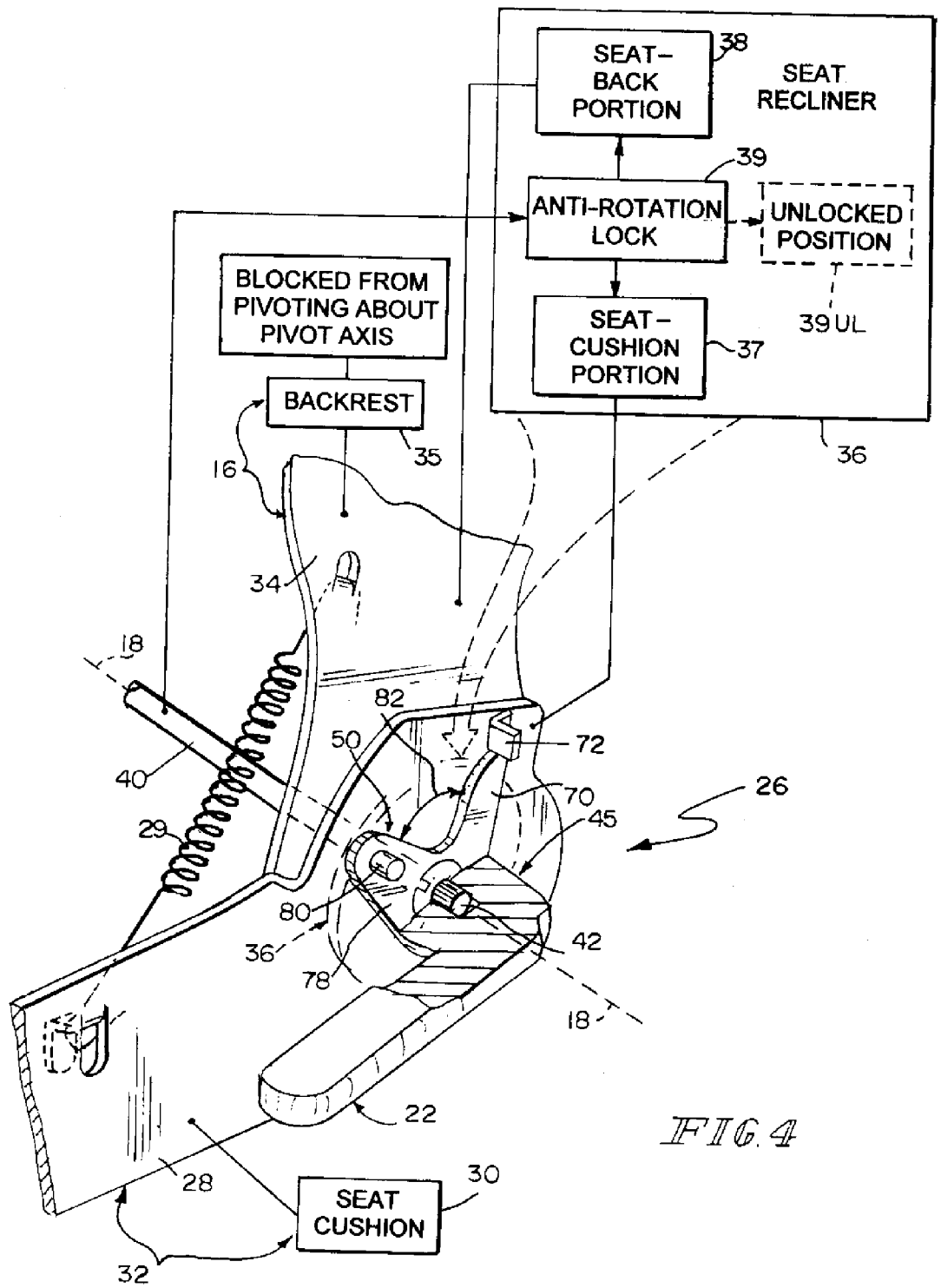
FIG. 4 is an enlarged perspective view of a seat hinge included in the seat-back motion controller provided in the vehicle seat of FIGS. 1-3 and a diagrammatic view of the round seat recliner (shown in phantom) coupled to a horizontally extending recliner control spindle mating with the recliner actuation lever and suggesting that the seat back is oriented to lie in the user-selected reclined position shown, for example, in FIGS. 1 and 8.
Figure 5:
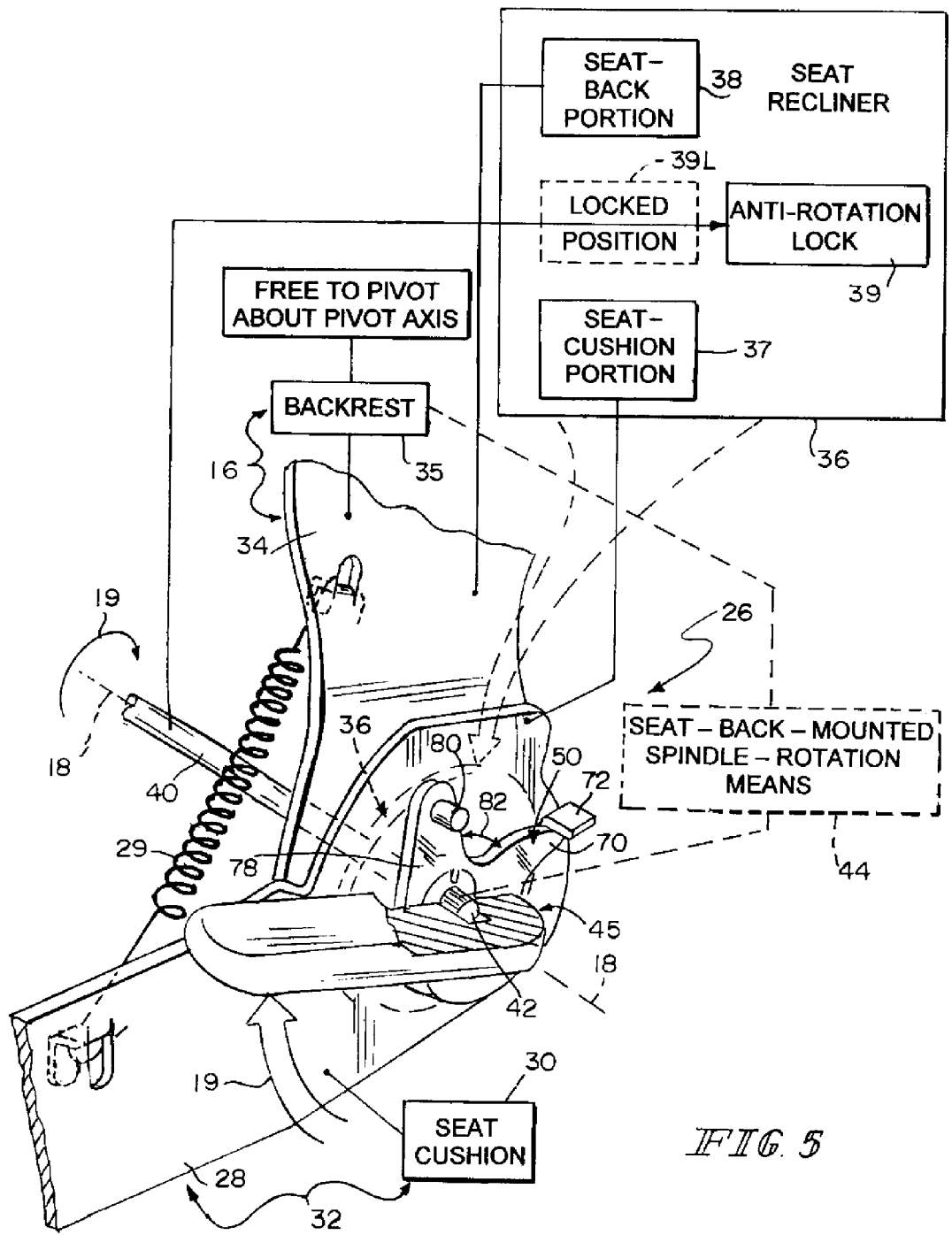
FIG. 5 is a view similar to FIG. 4 showing that a user can pivot the recliner actuation lever in a clockwise direction to rotate the recliner control spindle to cause an anti-rotation lock in the seat recliner to move from a locked position shown in FIG. 4 to the unlocked position shown in FIG. 5 to free the seat back so that it can be pivoted in either forward or rearward directions about a pivot axis established, for example, by the recliner control spindle.

As suggested in FIGS. 4 and 5, vehicle seat 14 includes a seat hinge 26 associated with recliner actuation lever 22. Seat hinge 26 includes a seat-cushion mount plate 28 adapted to be mounted to a seat cushion 30 to establish a seat base 32 and a backrest mount plate 34 adapted to be mounted to a backrest 35 to establish seat back 16. Backrest mount plate 34 is mounted using any suitable means for pivotable movement about recliner pivot axis 18 to free seat back 16 for forward and rearward movement relative to seat base 32 as suggested in FIGS. 8-13.

Seat hinge 26 also includes a seat recliner 36 shown diagrammatically and in phantom in FIGS. 4 and 5. Seat recliner 36 is associated with seat-cushion mount plate 28 and backrest mount plate 34 as suggested in FIGS. 4-5. Seat recliner 36 includes a housing 37, 38 and an anti-rotation lock 39 mounted for movement in housing 37, 38 between a locked position 39L arranged to anchor backrest mount plate 34 in a stationary position relative to seat-cushion mount plate 28 to establish a user-selected reclined position of seat back 16 relative to seat base 32 and an unlocked position 39UL arranged to free backrest mount plate 34 for forward and rearward pivotable movement relative to seat-cushion mount plate 28 to either a forward-leaning seat-back dumping position shown, for example, in FIGS. 2 and 10, a user-selected reclined position shown, for example, in FIGS. 1, 8, and 9, and a single seat-back reset memory position shown, for example, in FIGS. 3 and 13. A spring 29 is provided as shown in FIGS. 4, 5, and 7 to move seat back 16 forward relative to seat base 32 to assume the forward-leaning seat-back dumping position. Normally, spring 29 is a clock spring (not shown); however, any suitable spring will do.

It is within the scope of this disclosure to use any suitable seat recliner. Reference is made to U.S. Pat. No. 6,739,668 for descriptions of seat recliners and seat-back orientation control systems, which patent is hereby incorporated in its entirety herein. In an illustrative embodiment, housing 37, 38 of seat recliner 36 comprises a seat-cushion portion 37 coupled to seat-cushion mount plate 28 and a seat-back portion 38 coupled to backrest mount plate 34 as suggested diagrammatically in FIGS. 4 and 5. Seat-cushion and seat-back portions 37, 38 cooperate to form an interior region containing anti-rotation lock 39 therein.

Seat-back motion controller 12 also includes a recliner control spindle or shaft 40 coupled to anti-rotation lock 39 of seat recliner 36 as suggested diagrammatically in FIGS. 4 and 5 and also in FIGS. 8-13. Recliner control spindle 40 is supported for rotation about recliner pivot axis 18 to move anti-rotation lock 39 between the locked and unlocked positions in housing 37, 38 of seat recliner 36. In an illustrative embodiment, recliner actuation lever 22 is coupled to an exposed end 42 of recliner control spindle 40 and configured to rotate recliner control spindle 40 about recliner pivot axis 18 to move anti-rotation lock 39 between the locked and unlocked positions. Rotation of recliner actuation lever 22 about recliner pivot axis 18 moves anti-rotation lock 39 from the locked position to the unlocked position as shown diagrammatically in FIG. 5. Recliner control spindle 40 and recliner actuation lever 22 cooperate to form an anti-rotation-lock mover 45 as shown diagrammatically in FIG. 6 and illustratively in FIG. 7.

It is within the scope of this disclosure as suggested diagrammatically in FIG. 5 to provide a passenger-actuated seat-back-mounted spindle-rotation means 44 for rotating recliner control spindle 40 about recliner pivot axis 18 to move anti-rotation lock 39 between the locked and unlocked positions without having to grip and move recliner actuation lever 22. Such a spindle-rotation means 44 is often used by a passenger sitting in a vehicle back seat or a passenger that prefers not to stoop down to grip recliner actuation lever 22. In an illustrative embodiment, spindle-rotation means 44 comprises a movable actuator (not shown) mounted in a top or side portion of seat back 16 and a spindle-control linkage (not shown) arranged to extend through an interior region in sea back 16 and interconnect the movable actuator and recliner control spindle 40. A passenger can grip and move the movable actuator to cause the spindle-control linkage to operate and rotate recliner control spindle 40 about recliner pivot axis 18 without using recliner actuation lever 22.

Single-position-memory dump unit 10 is shown diagrammatically in FIG. 6 and illustratively in FIG. 7. Single-position-memory dump unit 10 is coupled to recliner control spindle 40 and configured to provide means for retaining anti-rotation lock 39 in unlocked position 39UL by blocking rotation of recliner control spindle 40 about recliner pivot axis 18 to free seat back 16 for unimpeded pivoting movement about recliner pivot axis 18 between a forward-leaning seat-back dumping position (shown in phantom in FIG. 6 and in solid in FIG. 10) and a rearward-leaning single predetermined seat-back reset memory position (shown in solid in FIGS. 6 and 13). As a result, during such rearward pivoting movement of seat back 16 from a dump position to a reset memory position, anti-rotation lock 39 is, in effect, blocked from relocking in each of the available predetermined user-selected recliner lock positions available to passengers in seat-back recline range 44 shown diagrammatically in FIG. 6 because single-position-memory dump unit 10 retains recliner control spindle 40 in a non-rotating stationary position while anti-rotation lock 39 is retained in unlocked position 39UL. Dump unit 10 functions to keep seat recliner 36 unlocked to allow passenger 20 to return seat back 16 to a single predetermined design nominal seat-back reset memory position without relocking in other forward-leaning or rearward-leaning position(s). During manufacture, the single predetermined seat-back reset memory position is selected to be a suitable reclined position of seat back 16 since, in many cases, this reclined position will be different from the user-selected reclined position of seat back 16 before seat back 16 is pivoted about recliner pivot axis 18 to assume the forward-leaning seat-back dumping position.

Single-position-memory dump unit 10 includes a seat-back dump control post 46 and an anti-rotation-lock mover anchor 48 as suggested in FIG. 6. Seat-back dump control post 46 is mounted to move when seat back 16 pivots about recliner control axis 18 as suggested in FIGS. 8-13. Anti-rotation-lock mover anchor 48 is coupled to recliner control spindle 40 as suggested in FIG. 6 and configured to anchor recliner control spindle 40 to block rotation thereof about recliner pivot axis 18 during forward pivoting movement of seat back 16 toward the forward-leaning seat-back dumping position. Anti-rotation lock mover anchor 48 is also configured to release recliner control spindle 40 to allow rotation thereof about recliner pivot axis 18 during rearward pivoting movement of seat back 16 toward the rearward-leaning single predetermined seat-back reset memory position.

Anti-rotation-lock mover anchor 48 includes a spindle-position controller 50, a controller rotation blocker 52, and a blocker actuator 54 including a dump actuator plate 56 and a dump actuator spring 58 as shown diagrammatically in FIG. 6 and illustratively in FIG. 7 and FIGS. 8-13. Anti-rotation-lock mover anchor 48 also includes a pivot 60 coupled to seat hinge 26 to establish a blocker pivot axis 62 that is separated from recliner pivot axis 18 as suggested in FIG. 7. Spindle-position controller 50 is mounted for pivotable movement about recliner pivot axis 18. Each of controller rotation blocker 52 and dump actuator plate 56 is mounted for pivotable movement about blocker pivot axis 62. Dump actuator spring 58 provides a link coupled to each of controller rotation blocker 52 and dump actuator plate 56.

Pivot 60 includes a pin 64 coupled to seat-cushion mount plate 28 and arranged to extend along blocker pivot axis 62 as suggested in FIG. 7. Pivot 60 also includes a cap 66 configured to be coupled to pin 64 and support dump actuator spring 58 as suggested in FIG. 7.

A sequence is illustrated in FIGS. 8-13 in which a user such as passenger 20 operates seat-back motion controller 12 including a single-position-memory dump unit 10 of the type shown in FIG. 7 to pivot seat back 16 from a user-selected reclined position shown in FIG. 8 to a forward-leaning seat-back dumping position shown in FIG. 11 and then (without unwanted premature locking in various available reclined positions in seat-back recline range 44) to a single predetermined seat-back reset memory position shown in FIG. 13. Rearward pivoting movement of seat back 16 from the forward-leaning seat-back dumping position to the single predetermined seat-back reset memory position is smooth and unimpeded owing to operation of single-position-memory dump unit 10. This solution keeps seat recliners 36, 36' unlocked and returns seat back 16 to a single predetermined design nominal position identified herein as a seat-back reset memory position. Known internal dump recliners experience seat back relock in the first available recline lock position when returning from the dump position. This first position is not typically a position in which an occupant would sit. It would require the occupant to have to readjust the seat back upon entering the vehicle.

Seat back 16 is moved to assume a user-selected reclined position as shown in FIG. 8 and also in FIG. 1. Recliner actuation lever 22 is configured normally moved to assume a horizontal at-rest position. Various components included in single-position-memory dump unit 10 are visible in FIG. 8.

Recliner actuation lever 22 is rotated manually by passenger 20 in clockwise direction 19 to rotate recliner control spindle 40 in anti-rotation lock mover 45 to move anti-rotation lock 59 included in each of first and second seat recliners 36, 36' from the locked position 36L to unlocked position 36UL. Once anti-rotation lock 39 is unlocked (as suggested in FIGS. 4 and 9), then seat back 16 can be pivoted in forward or rearward directions.

Forward pivoting movement of spring-loaded seat back 16 to assume the forward-leaning seat-back dumping position as soon as anti-rotation lock 39 is unlocked is shown, for example, in FIG. 10. Although spring 29 is shown to be an extension spring, it is common to use a clock spring (not shown). In this dumping position, a passenger 20 can enter the back seat of a vehicle easily as suggested in FIG. 2.

Further clockwise movement of recliner actuation lever 22 to change the position of controller rotation blocker 52 included in anti-rotation lock mover 45 to press against stop pad 72 included in spindle-position controller 52 of anti-rotation lock mover anchor 48. Engagement of controller rotation blocker 52 and stop pad 72 acts to hold anti-rotation locks 39 in first and second seat recliners 36, 361 in the unlocked position is shown in FIG. 1. This frees seat back 16 so that it can be pivoted in clockwise and counterclockwise directions.

Seat back 16 is free to be pivoted rearwardly by passenger 20 away from the seat-back dumping position while anti-rotation locks 39 are being held in the unlocked positions by operation of the anti-rotation-lock mover 48 of single-position-memory dump unit 10 as shown in FIG. 12. This allows seat back 16 to pivot freely and in an unimpeded manner from the forward-leaning seat-back dumping position to a rearward-leaning single predetermined reset memory position.

Seat back 16 has been moved by passenger 20 as shown in FIG. 13 to assume a single predetermined seat-back reset memory position that is different from the user-selected reclined position shown in FIG. 8. This movement was unimpeded due to operation of dump unit 10.

Spindle-position controller 50 includes a spindle mount 68 associated with recliner control spindle 40 and a pad-support flange 70 coupled to and arranged to extend away from spindle mount 68 as suggested in FIG. 7. Spindle-position controller 50 also includes a stop pad 72 coupled to pad-support flange 70 to move therewith and arranged to engage a portion of controller rotation blocker 52 when anti-rotation-lock mover anchor 48 of single-position-memory dump unit 10 functions to anchor recliner control spindle 40 and retain anti-rotation lock 39 in the unlocked position as suggested in FIG. 11.

Spindle-position controller 50 further includes a pin-support flange 78 coupled to spindle mount 68 and configured to extend away from spindle mount 68 and a motion-transfer pin 80 coupled to pin-support flange 78 as suggested in FIGS. 4, 5, and 7. Motion-transfer pin 80 is arranged to receive a force applied by dump actuator plate 56 of blocker actuator 54 to cause spindle-position controller 50 to pivot about recliner pivot axis 18 in clockwise direction 17 during forward pivoting movement of seat back 16 about recliner pivot axis 18 to the seat-back dumping position as suggested in FIGS. 10 and 11.

Pin-support flange 78 is an elongated member having a root end coupled to spindle mount 68 and a free end arranged to lie in spaced-apart relation to spindle mount 68 and coupled to motion-transfer pin 80 as suggested in FIG. 7. Pad-support flange 70 is an elongated member having a root end coupled to spindle mount 68 and a free end arranged to lie in spaced-apart relation to spindle mount 68 and coupled to stop pad 72. Pin-support flange and the pad-support flange cooperate to define an acute included angle 82 there between to provide spindle-position controller 50 with a substantially V-shaped configuration as suggested in FIGS. 4, 5, and 7.

Dump actuator plate 56 includes a plate pivot mount 84 mounted for pivotable movement about blocker pivot axis 62, a front trigger leg 86 arranged to extend away from plate pivot mount 84, and a pin-driver leg 88 arranged to extend away from plate pivot mount 84 as shown, for example, in FIG. 7. Dump actuator plate 56 is included in blocker actuator 54 as suggested in FIG. 7. Seat-back dump-control post 46 is configured to provide means for engaging and pivoting front trigger leg 86 about blocker pivot axis 62 in counterclockwise direction 17 to cause pin-driver leg 88 to pivot about blocker pivot axis 62 in counterclockwise direction 17 and apply a movement-inducing force to motion-transfer pin 80 to cause pin-support and pad-support flanges 78, 80 to pivot about recliner pivot axis 18 in clockwise direction 19 to move stop pad 72 to a predetermined position engaging controller rotation blocker 52 as suggested in FIGS. 9-11.

Dump actuator spring 58 is a link that is coupled to dump actuator plate 56 and to controller rotation blocker 52 as suggested in FIGS. 7 and 8. Link 58 is configured to cause controller rotation blocker 52 to pivot about blocker pivot axis 62 in counterclockwise direction 17 in response to pivoting movement of dump actuator plate 56 about blocker pivot axis 62 in counterclockwise direction 17 to engage stop pad 72 upon arrival of stop pad 72 at the predetermined position as suggested in FIGS. 10 and 11. Link 58 in an illustrative embodiment is a torsion spring having a first leg 581 coupled to dump actuator plate 56 and a second leg 582 coupled to controller rotation blocker 52 as suggested in FIGS. 7 and 8. Torsion spring 58 also includes a coil 583 arranged to interconnect first and second legs 581, 582 and wind around blocker pivot axis 62. A shaft 65 included in cap 66 of pivot 60 is arranged to extend through a central passage formed in coil 583 to provide means for supporting torsion spring 58 on pivot 60 as suggested in FIGS. 7 and 8. Shaft 65 is configured to mate with pin 64 as suggested in FIG. 7 to form pivot 60.

Controller rotation blocker 52 includes a blocker pivot mount 90 mounted for pivotable movement about blocker pivot axis 62, a rear trigger leg 92 arranged to extend away from blocker pivot mount 90 and away from front trigger leg 86 of dump actuator plate 56, and a controller-anchor leg 94 arranged to extend away from blocker pivot mount 90 as suggested in FIGS. 7 and 8. Controller-anchor leg 94 cooperates with pin-driver leg 88 to define a space therebetween receiving a portion of motion-transfer pin 80 therein as suggested in FIG. 8. Movement of pin-driver leg 88 about blocker pivot axis 62 in counterclockwise direction 17 is constrained to apply the movement-inducing force to motion-transfer pin 80 to cause spindle-position controller 50 to pivot in clockwise direction 19 and move stop pad 72 to the predetermined position ready to be engaged by a free end 95 of controller-anchor leg 94. Link (dump actuator spring) 58 is coupled to dump actuator plate 56 and to controller rotation blocker 52 and configured to cause controller-anchor leg 88 to pivot about blocker pivot axis 62 in counterclockwise direction 17 in response to pivoting movement of dump actuator plate 56 about blocker pivot axis 62 in counterclockwise direction 17 to engage stop pad 72 upon arrival of stop pad 72 at the predetermined position as suggested in FIG. 11. Dump actuator spring 58 is compressible to allow relative scissoring movement of pin-driver leg 88 relative to controller-anchor leg 94 as suggested in FIGS. 9-11 to allow movement of controller-anchor leg 94 to engage stop pad 72.

Controller-anchor leg 94 is arranged to extend away from blocker pivot mount 90 and engage stop pad 72 included in spindle-position controller 50 to cause spindle-position controller 50 to remain in the stationary position retaining anti-rotation lock 39 of seat recliner 36 in the unlocked position. Seat-back dump-control post 46 is configured to provide means for engaging and pivoting rear trigger leg 92 about blocker pivot axis 62 in clockwise direction 19 to cause controller-anchor leg 94 to move relative to spindle-position controller 50 to disengage stop pad 72 so that spindle-position controller 50 and recliner control spindle 40 are free to rotate about recliner pivot axis 18 to cause anti-rotation lock 39 to move from the locked position to the unlocked position. Seat-back dump-control post 46 is coupled to backrest mount plate 34 to pivot therewith about recliner pivot axis 18.

An outboard wedge unit 74 is included in anti-rotation-lock mover anchor 48 and unit 74 comprises controller rotation blocker 52 and blocker actuator 54 as suggested diagrammatically in FIG. 6 and illustratively in FIG. 7. Spindle-position controller 50 includes a plate 68, 70 formed to include an aperture 76 receiving a portion of recliner control spindle 40 therein and coupled to stop pad 72. Plate 68, 70 is arranged to lie in a space provided between seat recliner 36 and outboard wedge unit 74 as suggested in FIG. 7. Plate 68, 70 is arranged to lie in a space between seat-cushion mount plate 28 and outboard wedge unit 74. Seat-cushion mount plate 74 and plate 68, 70 are arranged to lie in a space provided between backrest mount plate 34 and outboard wedge unit 74.

The invention claimed is:

1. A seat-back motion controller for use in a vehicle seat including a reclinable seat back mounted for forward and rearward pivotable movement relative to a seat base, the seat-back motion controller comprising a seat hinge including a seat-cushion mount plate adapted to be mounted to a seat cushion in a vehicle seat to establish a seat base, a backrest mount plate adapted to be mounted to a backrest in a vehicle seat to establish a seat back and mounted for pivotable movement about a recliner pivot axis to free the seat back for forward and rearward movement relative to the seat base, and a seat recliner associated with the seat-cushion and backrest mount plates and configured to include a housing and an anti-rotation lock movable in the housing between a locked position arranged to anchor the backrest mount plate in a stationary position relative to the seat-cushion mount plate to establish a user-selected reclined position of the seat back relative to the seat base and an unlocked position arranged to free the backrest mount plate for forward and rearward pivotable movement relative to the seat-cushion mount plate to facilitate movement of the seat back relative to the seat base to one of a seat-back dump position, a user-selected reclined position, and a single seat-back reset memory position, an anti-rotation lock mover including a recliner control spindle coupled to the anti-rotation lock and supported for rotation about the recliner pivot axis to move the anti-rotation lock between the locked and unlocked positions and a recliner actuation system coupled to the recliner control spindle and configured to rotate the recliner control spindle about the recliner pivot axis to move the anti-rotation lock between the locked and the unlocked positions, and a single-position-memory dump unit including a moving seat-back dump-control post coupled to the seat back for movement therewith and an anti-rotation lock mover anchor arranged to intercept the moving seat-back dump-control post during forward and rearward pivoting movement of the seat back about the recline pivot axis, the anti-rotation lock mover anchor including a spindle-position controller coupled to the recliner control spindle to rotate therewith about the recliner pivot axis, a controller rotation blocker mounted for pivotable movement about a blocker pivot axis arranged to lie in spaced-apart relation to the recliner pivot axis, and blocker actuator means for pivoting the controller rotation blocker about the blocker pivot axis in a counterclockwise direction and pivoting the spindle-position controller about the recliner pivot axis in a clockwise direction to cause the controller rotation blocker to engage a stop pad included in the spindle-position controller upon exposure to a force applied by the moving seat-back dump-control post during forward pivoting movement of the seat back about the recliner pivot axis from the user-selected reclined position toward the seat-back dumping position while the anti-rotation lock has been moved to assume the unlocked position to retain the spindle-position controller in a stationary position to cause the recliner control spindle coupled thereto to remain in a stationary position retaining the anti-rotation lock in the unlocked position so that the seat back is free to pivot in a rearward direction from the seat-back dumping position to the single seat-back reset memory position.

2. The seat-back motion controller of claim 1, wherein the spindle-position controller includes a spindle mount associated with the recliner control spindle and a pad-support flange coupled to the spindle mount and configured to extend away from the spindle mount and carry the stop pad.

3. The seat-back motion controller of claim 1, wherein the spindle-position controller includes a plate formed to include an aperture receiving a portion of the recliner control spindle therein and coupled to the stop pad and the plate of the spindle-position controller is arranged to lie in a space provided between the seat recliner and an outboard wedge unit comprising the controller rotation blocker and the blocker actuator.

4. The seat-back motion controller of claim 3, wherein the plate of the spindle-position controller is arranged to lie in a space provided between the seat-cushion mount plate and the outboard wedge unit.

5. The seat-back motion controller of claim 3, wherein the seat-cushion plate and the plate of the spindle-position controller are arranged to lie in a space provided between the backrest mount plate and the outboard wedge unit.

6. The seat-back motion controller of claim 1, wherein the spindle-position controller further includes a pin-support flange coupled to the spindle mount and configured to extend away from the spindle mount and a motion-transfer pin coupled to the pin-support flange and arranged to receive a force applied by the blocker actuator means to cause the spindle-position controller to pivot about the recliner pivot axis in the clockwise direction during forward pivoting movement of the seat back about the recliner pivot axis to the seat-back dumping position.

7. The seat-back motion controller of claim 6, wherein the pin-support flange is an elongated member having a root end coupled to the spindle mount and a free end arranged to lie in spaced-apart relation to the spindle mount and coupled to the motion-transfer pin, the pad-support flange is an elongated member having a root end coupled to the spindle mount and a free end arranged to lie in spaced-apart relation to the spindle mount and coupled to the stop pad, and the pin-support flange and the pad-support flange cooperate to define an acute included angle therebetween to provide the spindle-position controller with a substantially V-shaped configuration.

8. The seat-back motion controller of claim 6, wherein the blocker actuator means includes a dump actuator plate including a plate pivot mount mounted for pivotable movement about the blocker pivot axis, a front trigger leg arranged to extend away from the plate pivot mount, and a pin-driver leg arranged to extend away from the plate pivot mount, and the seat-back dump-control post is configured to provide means for engaging and pivoting the front trigger leg about the blocker pivot axis in a counterclockwise direction to cause the pin-driver leg to pivot about the blocker pivot axis in the counterclockwise direction and apply a movement-inducing force to the motion-transfer pin to cause the pin-support and pad-support flanges to pivot about the recliner pivot axis in a clockwise direction to move the stop pad to a predetermined position engaging the controller rotation blocker.

9. The seat-back motion controller of claim 8, wherein the blocker actuator means further includes a link coupled to the dump actuator plate and to the controller rotation blocker and configured to cause the controller rotation blocker to pivot about the blocker pivot axis in a counterclockwise direction in response to pivoting movement of the dump actuator plate about the blocker pivot axis in the counterclockwise direction to engage the stop pad upon arrival of the stop pad at the predetermined position.

10. The seat-back motion controller of claim 9, wherein the link is a torsion spring having a first leg coupled to the dump actuator plate and a second leg coupled to the controller rotation blocker.

11. The seat-back motion controller of claim 8, wherein the controller rotation blocker includes a blocker pivot mount mounted for pivotable movement about the blocker pivot axis, a rear trigger leg arranged to extend away from the blocker pivot mount and away from the front trigger leg of the dump actuator plate, and a controller-anchor leg arranged to extend away from the controller-anchor leg and to extend away from the blocker pivot mount and to cooperate with the pin-driver leg to define a space there between receiving a portion of the motion-transfer pin therein, movement of the pin-driver leg about the blocker pivot axis in the counterclockwise direction is constrained to apply the movement-inducing force to the motion-transfer pin to cause the spindle-position controller to pivot in the clockwise direction and move the stop pad to the predetermined position, and the blocker actuator means further includes a link coupled to the dump actuator plate and to the controller rotation blocker and configured to cause the controller-anchor leg to pivot about the blocker pivot axis in a counterclockwise direction in response to pivoting movement of the dump actuator plate about the blocker pivot axis in the counterclockwise direction to engage the stop pad upon arrival of the stop pad at the predetermined position.

12. The seat-back motion controller of claim 1, wherein the controller rotation blocker includes a blocker pivot mount mounted for pivotable movement about the blocker pivot axis, a rear trigger leg arranged to extend away from the blocker pivot mount, and a controller-anchor leg arranged to extend away from the blocker pivot mount and engage the stop pad included in the spindle-position controller to cause the spindle-position controller to remain in the stationary position retaining the anti-rotation lock of the seat recliner in the unlocked position and the seat-back dump-control post is configured to provide means for engaging and pivoting the rear trigger leg about the blocker pivot axis in a clockwise direction to cause the controller-anchor leg to move relative to the spindle-position controller to disengage the stop pad so that the spindle-position controller and the recliner control spindle are free to rotate about the recliner pivot axis to cause the anti-rotation lock to move from the locked position to the unlocked position.

13. The seat-back motion controller of claim 12, wherein the seat-back dump-control post is coupled to the backrest mount plate to pivot therewith about the recliner pivot axis.

14. The seat-back motion controller of claim 12, wherein the blocker actuator includes a dump actuator plate mounted for pivotable movement about the blocker pivot axis and a link coupled to the dump actuator plate and to the controller rotation blocker and configured to cause the controller-anchor leg to pivot about the blocker pivot axis in a counterclockwise direction to engage the stop pad upon arrival of the stop pad at the predetermined position.

15. The seat-back motion controller of claim 14, wherein the link is a torsion spring having a first leg coupled to the dump actuator plate, a second leg coupled to the controller rotation blocker, and a coil interconnecting the first and second legs and being wound about an axis aligned with the blocker pivot axis.

16. The seat-back motion controller of claim 14, wherein the dump actuator plate includes a plate pivot mount mounted for pivotable movement about the blocker pivot axis, a front trigger leg arranged to extend away from the plate pivot mount and from the rear trigger leg, and a controller-driver leg arranged to extend away from the plate pivot mount to engage a portion of the spindle-position controller, and the seat-back dump-control post is configured to provide means for engaging and pivoting the front trigger leg about the blocker pivot axis in the counterclockwise direction to cause the controller-driver leg to pivot about the blocker pivot axis in a counterclockwise direction and apply a movement-inducing force to the portion of the spindle-position controller to cause the spindle-position controller to pivot about the recliner pivot axis in the clockwise direction to move the stop pad to the predetermined position and to engage the controller-anchor leg of the controller rotation blocker.

17. A seat-back motion controller for use in a vehicle seat including a declinable seat back mounted for forward and rearward pivotable movement relative to a seat base, the seat-back motion controller comprising
  a seat hinge including a seat-cushion plate associated with the seat base, a backrest mount plate associated with the seat back and arranged to pivot about a recline pivot axis relative to the seat-cushion plate, and a seat recliner configured to include an anti-rotation lock movable between a locked position locking the backrest mount plate to the seat-cushion plate and an unlocked position freeing the backrest mount plate for pivoting movement about a recliner pivot axis relative to the seat-cushion plate,
  a recliner control spindle coupled to the anti-rotation lock and supported for rotation about the recliner pivot axis to move the anti-rotation lock between the locked and unlocked positions, and
  a single-position-memory dump unit including a spindle-position controller, a controller rotation blocker, a blocker actuator, and a seat-back dump-control post, wherein the spindle-position controller is coupled to the recliner control spindle to rotate therewith in a clockwise direction about the recliner pivot axis toward a dump orientation in response to rotation of the recliner control spindle about the recliner pivot axis in the clockwise direction to move the anti-rotation lock to the unlocked position, the controller rotation blocker is mounted for pivotable movement in a counterclockwise direction about a blocker pivot axis that is separated from the recliner pivot axis, the blocker actuator includes a dump actuator plate mounted for pivotable movement in the counterclockwise direction about the blocker pivot axis and a link coupled to the dump actuator plate and to the controller rotation blocker and configured to cause the controller rotation blocker to pivot in the counterclockwise direction about the blocker pivot axis in response to pivoting movement of the dump actuator plate about the blocker pivot axis in the counterclockwise direction, and the seat-back dump-control post is mounted to move with the backrest mount plate relative to the dump actuator plate and to the controller rotation blocker during movement of the backrest mount plate relative to the seat-cushion plate when the anti-rotation lock is in the unlocked position to apply, during forward pivoting movement of the backrest mount plate from a user-selected reclined position toward a seat-back dumping position, a first movement-inducing force to the dump actuator plate to cause the dump actuator plate, the link, and the controller rotation blocker to pivot about the blocker pivot axis in a counterclockwise direction and to cause the spindle-position controller to pivot about the recliner pivot axis in a clockwise direction to move the controller rotation blocker to engage a stop pad included in the spindle-position controller to retain the spindle-position controller and the recliner control spindle in a stationary position urging the anti-rotation lock in the seat recliner to the locked position, and to apply, during rearward pivoting movement of the backrest mount plate from the seat-back dumping position toward the user-selected reclined position, a second movement-inducing force to the controller rotation blocker to cause the controller rotation blocker, the link, and the dump actuator plate to pivot about the blocker pivot axis in a clockwise direction to move the controller rotation blocker to disengage the stop pad included in the spindle-position controller to free the spindle-position controller and the recliner control spindle to rotate in a counterclockwise direction about the recliner control axis to allow the anti-rotation lock to move from the unlock position to the locked position.

18. The seat-back motion controller of claim 17, wherein the dump actuator plate includes a plate pivot mount mounted for pivotable movement about the blocker pivot axis, a front trigger leg arranged to extend away from the plate pivot mount, and a controller-driver leg arranged to extend away from the plate pivot mount, and wherein the seat-back dump-control post is configured to provide means for engaging and pivoting the front trigger leg about the blocker pivot axis in the counterclockwise direction to cause the controller-driver leg to pivot about the blocker pivot axis in the counterclockwise direction and apply a movement-inducing force to a portion of the spindle-position controller to cause the spindle-position controller to pivot about the recliner pivot axis in the clockwise direction to move the stop pad to a predetermined position to engage the controller rotation blocker.

19. The seat-back motion controller of claim 17, wherein the controller rotation blocker includes a blocker pivot mount mounted for pivotable movement about the blocker pivot axis, a rear trigger leg arranged to extend away from the blocker pivot mount, and a controller-anchor leg arranged to extend away from the blocker pivot mount and engage the stop pad included in the spindle-position controller to cause the spindle-position controller to remain in the stationary position retaining the anti-rotation lock of the seat recliner in the unlocked position and the seat-back dump-control post is configured to provide means for engaging and pivoting the rear trigger leg about the blocker pivot axis in a clockwise direction to cause the controller-anchor leg to move relative to the spindle-position controller to disengage the stop pad so that the spindle-position controller and the recliner control spindle are free to rotate about the recliner pivot axis to cause the anti-rotation lock to move from the locked position to the unlocked position.

* * * * *